US009154435B2

(12) United States Patent
Ong

(10) Patent No.: US 9,154,435 B2
(45) Date of Patent: *Oct. 6, 2015

(54) AUTOMATICALLY ADJUSTING BANDWIDTH ALLOCATED BETWEEN DIFFERENT ZONES IN PROPORTION TO SUMMATION OF INDIVIDUAL BANDWIDTH CAPS OF USERS IN EACH OF THE ZONES WHERE A FIRST-LEVEL ZONE INCLUDES SECOND-LEVEL ZONES NOT ENTITLED TO ANY GUARANTEED BANDWIDTH RATE

(71) Applicant: Guest Tek Interactive Entertainment Ltd., Calgary (CA)

(72) Inventor: David T. Ong, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,035

(22) Filed: Aug. 11, 2014

(65) Prior Publication Data

US 2014/0347999 A1 Nov. 27, 2014

Related U.S. Application Data

(63) Continuation of application No. 13/308,908, filed on Dec. 1, 2011, now Pat. No. 8,811,184.

(30) Foreign Application Priority Data

Aug. 24, 2011 (CA) ..................................... 2750345

(51) Int. Cl.
*H04L 12/873* (2013.01)
*H04L 12/24* (2006.01)
(Continued)

(52) U.S. Cl.
CPC .......... *H04L 47/527* (2013.01); *H04L 41/0896* (2013.01); *H04L 47/2441* (2013.01); *H04L 47/6255* (2013.01); *H04L 47/781* (2013.01); *H04L 47/808* (2013.01); *H04L 63/08* (2013.01)

(58) Field of Classification Search
CPC ................................ H04L 47/00; H04L 41/00
See application file for complete search history.

(56) References Cited

U.S. PATENT DOCUMENTS 5,231,633 A * 7/1993 Hluchyj et al. ................ 370/429
5,889,956 A * 3/1999 Hauser et al. ................. 709/226
(Continued)

FOREIGN PATENT DOCUMENTS

CA 2750345 12/2011
WO 01/031861 A9 11/2002
WO 2011005710 A2 1/2011

OTHER PUBLICATIONS

Martin Devera and Don Cohen, "HTB Linux queuing discipline manual—user guide", last updated May 5, 2002, downloaded from http://luxik.cdi.cz/~devik/qos/htb/manual/userg.htm.

*Primary Examiner* — Andrew Lai
*Assistant Examiner* — Sumitra Ganguly
(74) *Attorney, Agent, or Firm* — ATMAC Patent Services Ltd.; Andrew T. MacMillan

(57) ABSTRACT

A bandwidth management system includes a plurality of queues respectively corresponding to a plurality of zones. An enqueuing module receives network traffic from one or more incoming network interfaces, determines a belonging zone to which the network traffic belongs, and enqueues the network traffic on a queue corresponding to the belonging zone. A dequeuing module selectively dequeues data from the queues and passes the data to one or more outgoing network interfaces. When dequeuing data from the queues the dequeuing module dequeues an amount of data from a selected queue, and the amount of data dequeued from the selected queue is determined according to user load of a zone to which the selected queue corresponds.

20 Claims, 9 Drawing Sheets

(51) Int. Cl.
  *H04L 12/851* (2013.01)
  *H04L 12/863* (2013.01)
  *H04L 12/911* (2013.01)
  *H04L 12/927* (2013.01)
  *H04L 29/06* (2006.01)

(56) References Cited

U.S. PATENT DOCUMENTS

| | | | |
|---|---|---|---|
| 7,215,675 B2 * | 5/2007 | Kramer et al. | 370/395.4 |
| 7,324,473 B2 * | 1/2008 | Corneille et al. | 370/328 |
| 8,811,184 B2 * | 8/2014 | Ong | 370/237 |
| 2002/0003806 A1 | 1/2002 | McKinnon, III et al. | |
| 2003/0005112 A1 | 1/2003 | Krautkremer | |
| 2005/0091539 A1 | 4/2005 | Wang et al. | |
| 2005/0094643 A1 | 5/2005 | Wang et al. | |
| 2006/0221823 A1 | 10/2006 | Shoham et al. | |
| 2008/0098062 A1 | 4/2008 | Balia | |
| 2010/0189129 A1 | 7/2010 | Hinosugi et al. | |
| 2012/0185586 A1 | 7/2012 | Olshansky | |
| 2013/0051237 A1 | 2/2013 | Ong | |
| 2013/0107872 A1 | 5/2013 | Lovett et al. | |

* cited by examiner

Quantum calculation table

| Zone/Queue | User load (# of current users) | Scale factor (maximum to 60000) | Calculated scaled quantum | Divided by MTU(1500), rounded up | Rounded quantum (bytes) |
|---|---|---|---|---|---|
| Meeting room #1 | 65 | 312.5 | 20312.5 | 14 | 21000 |
| Meeting room #2 | 24 | 312.5 | 7500 | 5 | 7500 |
| Penthouse Suite | 3 | 312.5 | 937.5 | 1 | 1500 |
| Upgraded room | 2 | 312.5 | 625 | 1 | 1500 |
| Remaining bandwidth | 192 | 312.5 | 60000 | 40 | 60000 |
| Guest room A | 2 | 312.5 | 625 | 1 | 1500 |
| Guest room B | 1 | 312.5 | 312.5 | 1 | 1500 |
| ... | ... | ... | ... | ... | ... |

Quantum calculation table

| Zone/Queue | User load (# of current users) | Scale factor (minimum to 1500) | Quantum (bytes) |
|---|---|---|---|
| Meeting room #1 | 0 (assume 1) | 1500 | 1500 |
| Meeting room #2 | 3 | 1500 | 4500 |
| Penthouse Suite | 2 | 1500 | 3000 |
| Upgraded room | 1 | 1500 | 1500 |
| Remaining bandwidth | 7 | 1500 | 10500 |
| Guest room A | 2 | 1500 | 3000 |
| Guest room B | 1 | 1500 | 1500 |
| ... | ... | ... | ... |

Quantum calculation table

| Zone/Queue | # of users at 256kbits | # of users at 1024kbits | User load (sum of current user caps in kbits) | Scale factor (minimum to 1500) | Calculated scaled quantum | Rounded quantum (bytes, to nearest multiple of MTU) |
|---|---|---|---|---|---|---|
| Room #1 | 40 | 0 | 10240 | 0.146484375 | 1500 | 1500 |
| Room #2 | 0 | 40 | 40960 | 0.146484375 | 6000 | 6000 |
| Room #3 | 27 | 13 | 20224 | 0.146484375 | 2962.5 | 3000 |
| Room #4 | 13 | 27 | 30976 | 0.146484375 | 4537.5 | 4500 |

FIG. 8

AUTOMATICALLY ADJUSTING BANDWIDTH ALLOCATED BETWEEN DIFFERENT ZONES IN PROPORTION TO SUMMATION OF INDIVIDUAL BANDWIDTH CAPS OF USERS IN EACH OF THE ZONES WHERE A FIRST-LEVEL ZONE INCLUDES SECOND-LEVEL ZONES NOT ENTITLED TO ANY GUARANTEED BANDWIDTH RATE

CROSS-REFERENCE TO RELATED APPLICATIONS

This application is a continuation of U.S. patent application Ser. No. 13/308,908 filed Dec. 1, 2011, which claims the benefit of Canadian Patent Application No. 2,750,345 filed Aug. 24, 2011. Both of these applications are incorporated herein by reference.

BACKGROUND OF THE INVENTION (1) Field of the Invention

The invention pertains generally to bandwidth management. More specifically, the invention relates to allocating available bandwidth shared by a plurality of users.

(2) Description of the Related Art

Travellers increasingly view in-room high speed Internet access (HSIA) as a requirement when choosing at which hotel to stay. Business travellers may need to access company networks while on the road and tourists may wish to upload photos and send email to family friends while travelling. To provide in-room HSIA, hotels typically purchase a connection to the Internet from a local Internet service provider (ISP). The ISP provides the hotel with a fixed amount of bandwidth determined according to the ISP's pricing structure or other constraints. The hotel shares the available bandwidth between the hotel guests, users in meeting and conference rooms, and the hotel's networked computer systems.

A large hotel may have hundreds or even thousands of guests staying in guest rooms and utilizing meeting rooms—each competing for Internet bandwidth. One or more computer systems in the hotel may additionally need to transfer data via the Internet such as to receive reservations from external travel agencies or to download content for playback by guests using the hotel's in-room media and entertainment system. Because user satisfaction will be lowered if access to the Internet is slow, unresponsive, or unreliable, the available Internet bandwidth provided by the ISP needs to be effectively allocated between the various users within the hotel.

Typically, when a user connects a network device to the hotel's LAN, the user is required by the hotel's HSIA system to authenticate and gain access to the network, for example, by providing a password or other information such as room number and registered guest's name. Once authorized, traffic shaping is performed on a per-user basis in order to cap each user's maximum usage at a certain level while still sharing the total available bandwidth between all guests and other applications within the hotel. For example, a basic user bandwidth cap may limit each user to at most receive 256 kbit/sec of the hotel's available bandwidth to the Internet. The actual amount received by the user may be less than the cap during peak usage times.

Some hotels allow users to purchase "upgraded" bandwidth, which typically involves raising the user's individual bandwidth cap while still sharing the available bandwidth with other users. For example, the user's cap may be raised to 1024 kbit/sec after a payment of $9.99 is received. Again, when bandwidth is upgraded in this way, the maximum throughput is limited to the cap but the minimum throughput is not limited and instead depends on how much bandwidth other users are currently using.

A hotel may also allow a user to purchase an amount of guaranteed bandwidth that is not shared with other users. Guaranteed bandwidth is often also provided by the hotel to meeting and conference rooms, and the users of these rooms share the room's allocation. The amount of guaranteed bandwidth allocated to hotel guests is generally set according to an amount purchased by the user during a sign-in process, and the amount of guaranteed bandwidth allocated to conference and meeting rooms is typically determined when the room is booked and may be a function of the booking price to allow the conference organizer to pay according to the level of bandwidth required for the conference.

When bandwidth is guaranteed, ideally the minimum bandwidth that a user (or room, etc) benefiting from the guarantee will ever experience will be the guaranteed rate. In some cases, the bandwidth may also be capped at a higher rate so when there is bandwidth in the hotel available over and above the guaranteed rate, the user may experience even higher rates. When the hotel is provided with a fixed total ISP bandwidth, care must be taken by the hotel to not oversell guaranteed bandwidth or it may be impossible for the hotel to actually deliver the guaranteed rates when usage is high.

Traffic shaping and prioritization may also be performed by monitoring and detecting traffic types and giving preferential treatment for certain time-sensitive applications such as teleconferencing voice and video traffic. Compression, caching, and blocking technologies (i.e., blocking malware and other unwanted web traffic) may also be utilized by the hotel's HSIA system to reduce unnecessary bandwidth utilization and thereby increase the bandwidth available to share between users.

Although the above-described methods of managing bandwidth within a hotel are useful, they also tend to be unfair to certain users. For example, in some circumstances a user who has not upgraded to an amount of guaranteed bandwidth may be starved for bandwidth when sharing a small amount of available bandwidth with other users. Due to a variety of reasons it may not be possible for this user to purchase guaranteed bandwidth, for example, because the total ISP connection bandwidth is limited and other users (i.e., meeting rooms and/or VIP guests) may already have reserved the hotel's limit on guaranteed bandwidth. Although, the user may be able to upgrade to a higher individual bandwidth cap, during peak usage times when bandwidth is in high demand, the actual portion of bandwidth received by the user may not even reach the lower cap so having a higher cap will provide no benefit. Further techniques to optimize bandwidth allocation between multiple users to help prevent bandwidth starvation in these situations would be beneficial.

BRIEF SUMMARY OF THE INVENTION

According to an exemplary configuration of the invention there is provided a bandwidth management system including a plurality of queues respectively corresponding to a plurality of zones. An enqueuing module receives network traffic from one or more incoming network interfaces, determines a belonging zone to which the network traffic belongs, and enqueues the network traffic on a queue corresponding to the belonging zone. A dequeuing module selectively dequeues data from the queues and passes the data to one or more outgoing network interfaces. When dequeuing data from the queues the dequeuing module dequeues an amount of data from a selected queue, and the amount of data dequeued from the selected queue is determined according to user load of a zone to which the selected queue corresponds.

According to another exemplary configuration of the invention there is provided a bandwidth management system including a plurality of queues respectively corresponding to a plurality of zones. One or more processors are configured to receive network traffic from one or more incoming network interfaces, determine a belonging zone to which the network traffic belongs, enqueue the network traffic on a queue corresponding to the belonging zone, selectively dequeue data from the queues, and pass the data to one or more outgoing network interfaces. When selectively dequeuing data from the queues the one or more processors are configured to dequeue an amount of data from a selected queue, and the amount of data dequeued from the selected queue is determined according to user load of a zone to which the selected queue corresponds.

According to another exemplary configuration of the invention there is provided a bandwidth management apparatus including a plurality of queues respectively corresponding to a plurality of zones. Included is means for receiving network traffic, means for determining a belonging zone to which the network traffic belongs and enqueuing the network traffic on a queue corresponding to the belonging zone, and means for selectively dequeuing data from the queues and passing the data to one or more destinations. Selectively dequeuing data from the queues involves dequeuing an amount of data from a selected queue, the amount of data being determined according to user load of a zone to which the selected queue corresponds.

According to another exemplary configuration of the invention there is provided a method of allocating bandwidth between a plurality of zones. The method includes providing a plurality of queues respectively corresponding to the plurality of zones. The method further includes receiving network traffic from one or more incoming network interfaces and determining a belonging zone to which the network traffic belongs. The method further includes enqueuing the network traffic on a queue corresponding to the belonging zone, and selectively dequeuing data from the queues and passing the data to one or more outgoing network interfaces. Selectively dequeuing data from the queues involves dequeuing an amount of data from a selected queue, the amount of data being determined according to user load of a zone to which the selected queue corresponds.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof.

FIG. 5 illustrates a quantum calculation table describing a calculation process that the quantum manager of FIG. 4 may utilize to calculate a quantum for each queue according to the user load example shown in FIG. 3.

FIG. 6 illustrates a quantum calculation table describing a calculation process that the quantum manager of FIG. 4 may utilize to calculate the quantum for each queue according to another user load example for the zones shown in FIG. 3.

FIG. 8 illustrates a quantum calculation table describing a calculation process that a quantum manager may utilize to calculate a quantum for a queue of each zone of FIG. 8 when the user load of each zone corresponds to a summation of bandwidth caps of the current users in the zone.

DETAILED DESCRIPTION

Figure 1:
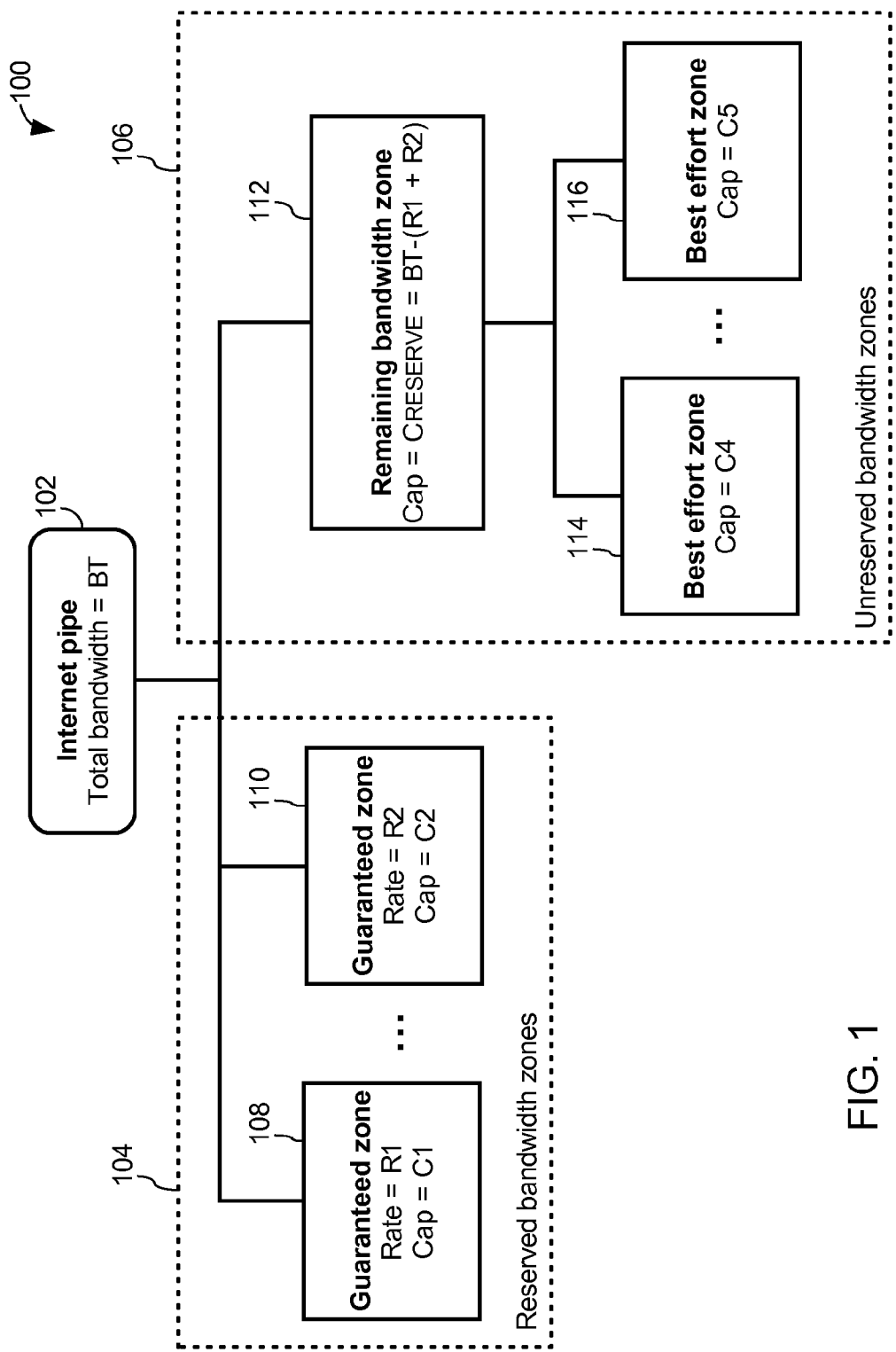
FIG. 1 illustrates a generalized bandwidth zone tree-structure according to an exemplary configuration of the invention.

FIG. 1 illustrates a generalized bandwidth zone tree-structure according to an exemplary configuration of the invention. The definition of a "zone" according to the invention is flexible and depends upon application-specific design requirements. Generally speaking, zones represent manageable divisions of users, user devices, and/or other lower-level zones. Zones may be logically and/or physically separated from other zones. For example, different zones may be isolated on separate local area networks (LANs) or virtual LANs (VLANs) corresponding to separate rooms or areas of a hotel, or different zones may share a same LAN but correspond to different service levels of users within a hotel. The zones and tree-structure may be dynamic and change at any time as users associated with certain zones upgrade their Internet access or when meeting reservations begin and end, for example.

In the example zone organization of FIG. 1, an Internet pipe 102 providing a total bandwidth (BT) is shared between a set of reserved bandwidth zones 104 and a set of unreserved bandwidth zones 106. The set of reserved bandwidth zones 104 are arranged on a first-level of the tree and include a first guaranteed zone 108 having a guaranteed bandwidth rate of R1 and a maximum bandwidth usage cap of C1, and a second guaranteed zone 110 having a guaranteed bandwidth rate of R2 and a cap of C2. Bandwidth rates R1, R2 are guaranteed to the zone; when there is unused bandwidth in the hotel, each zone may also obtain extra bandwidth up to its cap C1, C2. Each zone's cap C1, C2 may be equal to or higher than the zone's reserved rate R1, R2. Additionally, the reserved rate R1, R2 and cap C1, C2 of each zone may be changed at any time.

In the set of unreserved bandwidth zones 106, there is a single first-level remaining bandwidth zone 112 that may obtain up to a cap amount of bandwidth that still leaves at least the reserved bandwidth available for each of the reserved bandwidth zones 104. For example, using the zones illustrated in FIG. 1, CRESERVE=BT−(R1+R2). The CRESERVE cap may be automatically set in this way to ensure that users who have purchased guaranteed bandwidth can utilize their full guaranteed allotment capacity at any time and will not be affected by overuse by the unreserved bandwidth zones 106. Although capping the remaining bandwidth zone 112 at CRESERVE means there may be some wasted bandwidth capacity when the reserved bandwidth zones 104 are not utilizing their full rates R1, R2, the CRESERVE cap advantageously preserves interactivity for each of the reserved bandwidth zones 104 and allows immediate bandwidth usage by the reserved bandwidth zones 104 such as is needed during bandwidth speed tests or intermittent traffic bursts, for example.

In some configurations, the caps C1, C2 of the guaranteed zones 108, 110 may similarly each be automatically set to prevent overuse of one of the reserved bandwidth zones 104 from affecting another of the reserved bandwidth zones 104. For example, using the zones illustrated in FIG. 1, C1 may be automatically set to BT−R2, and C2 may be automatically set to BT−R1. In other configurations, the caps C1, C2 may be set to lower values to preserve bandwidth for use by the unreserved bandwidth zones 106 or be set to higher values when it is not a concern if one of the reserved bandwidth zones 104 interferes with another of the reserved bandwidth zones 104 such as when there is a only a single guaranteed zone 108, 110.

Under the first-level remaining bandwidth zone 112 are a number of second-level best effort zones 114, 116 each having its own cap. For example, best effort zone 114 has cap C4 and best effort zone 116 has cap C5. Caps C4, C5 are usually lower than CRESERVE and may be adjusted at any time such as when a user of a particular guest room upgrades to a higher bandwidth cap, for example.

A second-level best effort zone 114, 116 may be automatically moved to become one of the first-level reserved bandwidth zones 104 and given a guaranteed bandwidth rate such as when a user upgrades a room to a guaranteed bandwidth rate, for example. Likewise, a guaranteed zone 108, 110 may have its reserved rate R1, R2 set to zero (or otherwise deleted) and be automatically moved to become a second-level best effort zone under the remaining bandwidth zone 112. This may occur, for example, when a guaranteed bandwidth rate upgrade expires or when a VIP user entitled to guaranteed bandwidth in a room checks outs and the room automatically becomes a best effort zone 114, 116.

Figure 2:
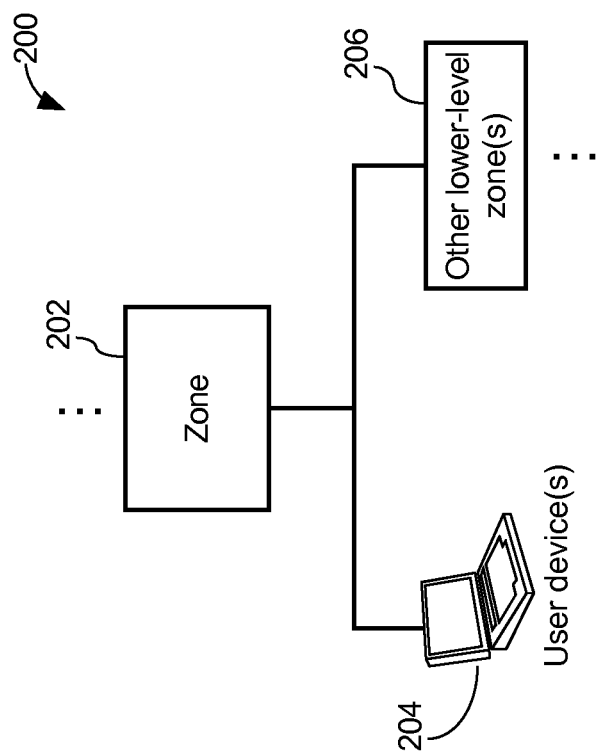
FIG. 2 illustrates how each zone of FIG. 1 may include one or more user devices and/or may include other zones at a lower level of the tree-structure.

FIG. 2 illustrates how each zone 202 may include one or more user devices 204 and/or may include other lower-level zones 206. Such parent zones 202 include all the user devices and/or additional zones from their lower-level child zones 206. Although the examples illustrated in FIG. 1 and FIG. 2 have first-level zones and second-level zones, the invention is not limited to a two-level bandwidth zone tree-structure. For example, a single level tree-structure is illustrated later in FIG. 7. Additionally, three or greater-level tree-structures are also possible and may be beneficial when there are many sub categories of a higher level zone, for example.

Figure 3:
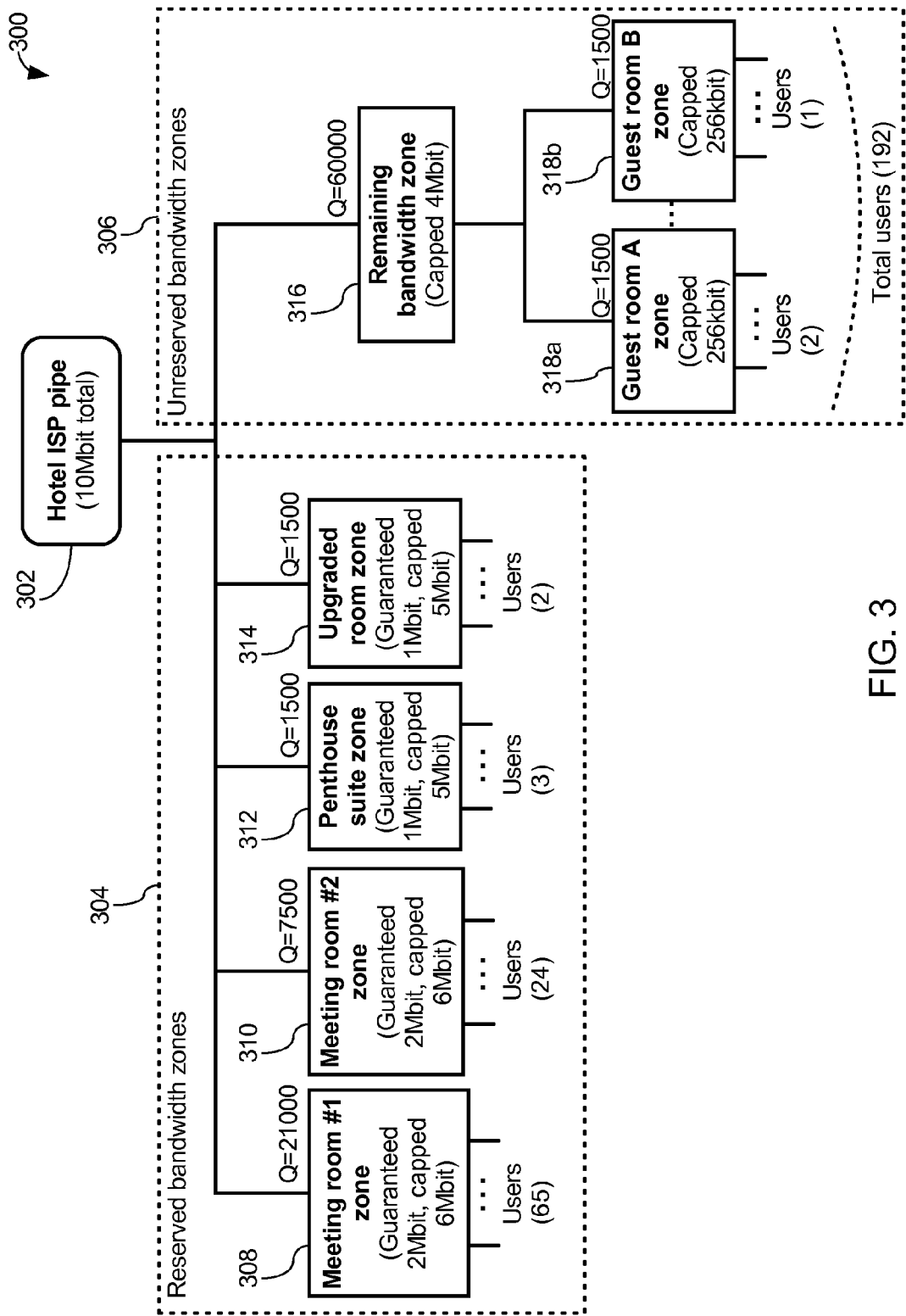
FIG. 3 illustrates a beneficial organization of bandwidth zones in a hotel according to an exemplary configuration of the invention.

FIG. 3 illustrates a beneficial organization of bandwidth zones in a hotel 300 according to an exemplary configuration of the invention. In this example, the hotel's ISP pipe 302 provides a total bandwidth of 10 Mbit/sec shared between a number of reserved bandwidth zones 304 and a number of unreserved bandwidth zones 306. Following the tree-structure organization introduced in FIG. 1, the reserved bandwidth zones 304 are each positioned at a first-level of the tree and include a first meeting room zone 308, a second meeting room zone 310, a penthouse suite zone 312, and an upgraded room zone 314. A single first-level remaining bandwidth zone 316 includes a number of second-level guest room zones 318 including a first guest room zone 318a and second guest room zone 318b.

In this example, the remaining bandwidth zone 316 is automatically capped at 4 Mbit/sec so that even when at full utilization there is still enough bandwidth left over (e.g., 6 Mbit/sec remaining) within the hotel 300 to accommodate each of the reserved bandwidth zones 304 operating at full utilization according to their guaranteed rates. Additionally, guaranteed zones 308, 310 are automatically capped at 6 Mbit/sec and guaranteed zones 312, 314 are automatically capped at 5 Mbit/sec to ensure that when any one operates at full capacity there is enough bandwidth to accommodate each of the other reserved bandwidth zones 304. As previously mentioned, automatically setting the caps in this way preserves the interactivity of the guaranteed bandwidth zones 308, 310, 312, 314. When the guaranteed rates of any of the reserved bandwidth zones 304 are changed, the bandwidth caps throughout the zones in the hotel 300 may be automatically adjusted by the hotel's bandwidth management system accordingly.

As shown in FIG. 3, each zone has an example number of current users to help describe this configuration of the invention. In this configuration, the word "users" refers to the different user devices 204 since the hotel's HSIA system will generally identify each user device 204 with a unique IP address and will provide an individual bandwidth cap on a per user device 204 basis. However, in other configurations, the term "users" may instead refer to different human users as tracked by their user devices 204. For example, when a particular zone has a single hotel guest utilizing three user devices 204, the zone may only be determined to include a single user as each of the IP addresses of the three user devices 204 are associated with the same user in a database. In yet other configurations, "users" may also include automated applications, tasks, or servers such as the various components of the hotel's HSIA system or other networked systems in the hotel 300. In general, the term "users" in each of the various configurations refers to agents that compete for available bandwidth, and any mechanism of identifying and distinguishing current users may be utilized in conjunction with the invention.

Although not illustrated in FIG. 3, each user under a zone may in fact be included in a user-specific lower-level child zone having a user-specific cap (and/or reserved rate). This configuration is beneficial to prevent each user under a zone from monopolizing all the bandwidth assigned to the zone. For example, a user that tries to bit-torrent under a zone will not unfairly take more than their allotted bandwidth cap from other users sharing the bandwidth under that zone.

Additionally, the number of current users indicated in FIG. 3 is meant only as an example snapshot of one particular time period and it is expected the numbers of current users of each zone 308, 310, 312, 314, 316, 318a, 318b will change over time. For example, after a meeting in the first meeting room zone 308 ends, the number of users of the first meeting room zone 308 will drop from sixty-five to zero. Then, when a next meeting begins, the user count will rapidly climb up to another level dependent upon how many users bring electronic devices 204 that are connected to the network. The number of current users of the other zones 310, 312, 314, 316, 318a, 318b may similarly change over time as well.

The number of current users of the remaining bandwidth zone 316 is one-hundred and ninety-two in this example. This number includes all the current users of the various guest room zones 318 that are included as second-level zones under the first-level remaining bandwidth zone 316. Each guest room zone 318 may only have one or two current users, but the hotel 300 in this example has hundreds of guest rooms and, due to the zone tree-structure, all of the current guest room users add up to form the total number of current users of remaining bandwidth zone 316.

For illustration purposes, the upload direction (hotel to ISP) will be described and the rates/caps shown for each zone indicate the upload speeds in the following description. However, these rates/caps may also apply in the download direction, or the download direction could have different rates/caps for each zone. Regardless, the invention may be used in both the upload and download directions or may be used only in a single direction depending upon the specific bandwidth management requirements of the target application.

In this example, the hotel ISP pipe 302 has a total of 10 Mbit/sec bandwidth provided by the ISP and each of the first-level reserved bandwidth zones 304 is guaranteed some of that bandwidth. Even if each of the reserved bandwidth zones 304 is utilizing its full guaranteed rate, there is still an available 4 Mbit/sec remaining that may be shared among the various first-level zones in the hotel.

According to this configuration of the invention, the available bandwidth is shared between zones at the same level in the zone tree. This means the 4 Mbit/sec in the above example will be shared between the first-level zones including the first meeting room zone 308, the second meeting room zone 310, the penthouse suite zone 312, the upgraded room zone 314, and the remaining bandwidth zone 316. Even when sharing available bandwidth, if a zone has a bandwidth cap, that zone may not obtain any bandwidth above the cap level.

Each zone has a quantum (shown as example Q values indicated in FIG. 3) representing an amount of bytes that can be served at a single time from the zone and passed to a higher-level zone (or to the hotel ISP pipe 302). According to this configuration of the invention, the quantums are dynamically adjusted according to the user load of each zone, and the user load of each zone corresponds to the number of current users in the zone.

When each zone is implemented as one or more queues enforcing rate and cap limits, the quantum indicates the maximum number of bytes that can be dequeued (i.e., removed from a particular queue) at one time. In some configurations, the cap limit may prevent the full quantum of bytes from being dequeued from a queue corresponding to a particular zone if this would cause the bandwidth provided to the zone to exceed its cap limit. In another configuration, as long as the data in the queue is sufficient, the quantum of bytes is always dequeued at once; however, the frequency of dequeuing the quantum of bytes may be reduced in order to limit the average bandwidth to the zone's cap.

Figure 4:
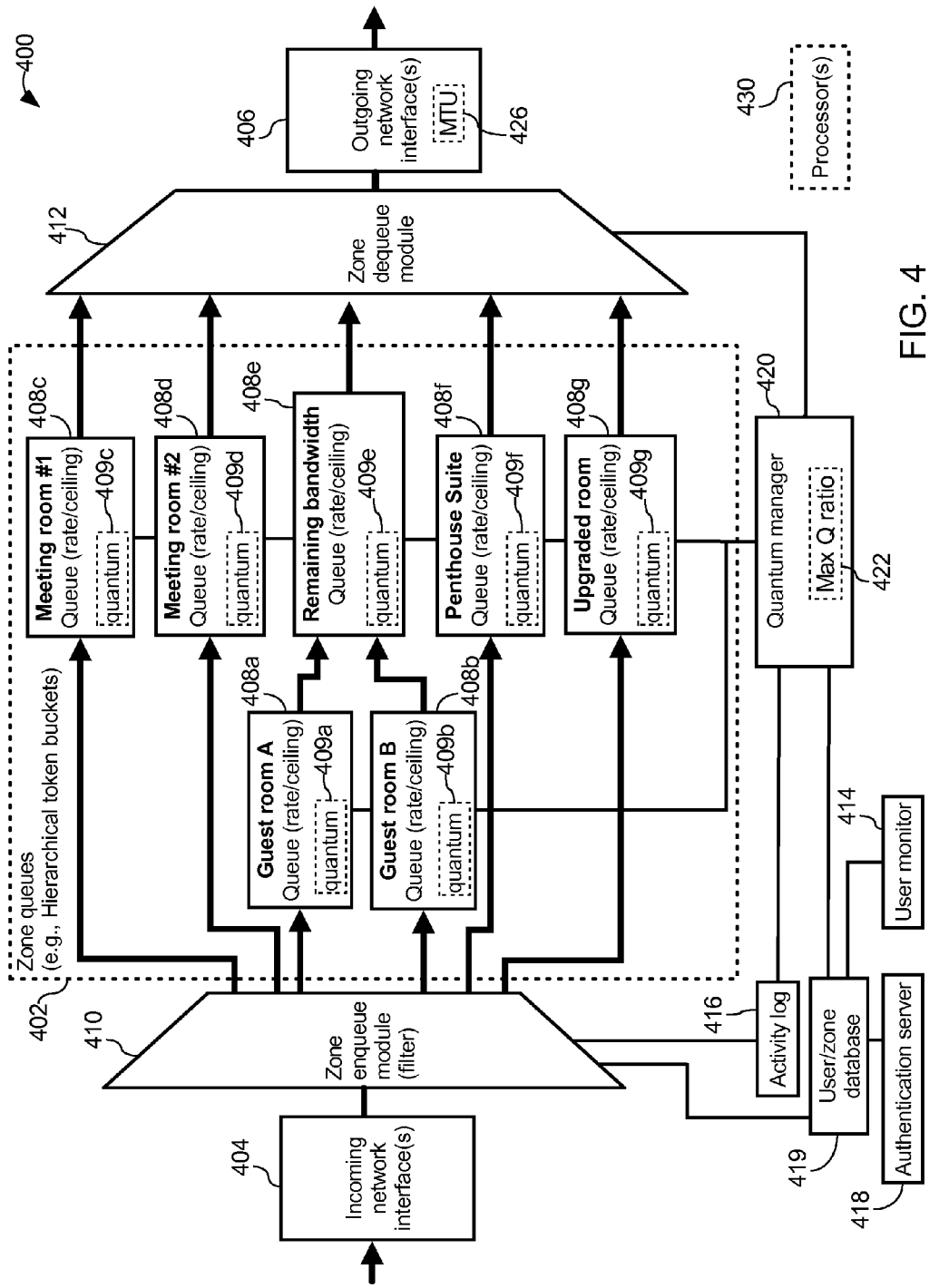
FIG. 4 illustrates a bandwidth management system having a plurality of queues respectively corresponding to the zones of FIG. 3 according to an exemplary configuration of the invention.

FIG. 4 illustrates a bandwidth management system 400 having a plurality of queues 408 where each individual queue 408 respectively corresponds to one of the zones of FIG. 3 and includes a queue-specific quantum 409 according to an exemplary configuration of the invention. In this example, the bandwidth management system 400 further includes an incoming network interface 404, an outgoing network interface 406, a zone enqueuing module 410, a zone dequeuing module 412, a user monitor 414, a network activity log 416, an authentication server 418, a user/zone database 419, and a quantum manager 420. The quantum manager 420 is preprogramed with a maximum quantum ratio 422. The outgoing network interface 406 has a maximum transport unit (MTU) 426, for example, 1500 bytes when the outgoing network interface 406 is of the Ethernet type.

Again, although the bandwidth management system 400 is shown operating in a single direction from incoming network interface 404 to outgoing network interface 406, in some configurations, there may be a similar structure in both upload and download directions. The bandwidth management system 400 may be used to manage bandwidth in the upload direction (hotel to ISP) and/or download direction (ISP to hotel) according to different configurations. Additionally, the incoming network interface 404 may in fact be a plurality of incoming network interfaces and the outgoing network interface 406 may in fact be a plurality of outgoing network interfaces. Having multiple incoming and outgoing network interfaces 404, 406 allows for redundant communication links in the event of a fault and also allows for higher overall bandwidth capacity by multiplying the number of interfaces by the maximum capacity of each interface.

In operation, the zone enqueuing module 410 receives network traffic from the incoming network interface 404, determines a belonging zone to which the network traffic belongs, and enqueues the network traffic on a queue 408 corresponding to the belonging zone. For example, the zone enqueuing module 410 may be implemented as one or more filters for classifying to which zone an Ethernet frame (or IP packet, etc) received from the incoming network interface 404 belongs. In this example, when network traffic belongs to multiple zones, the zone enqueuing module 410 enqueues the received network traffic in the queue 408 corresponding to the lower-level belonging zone. For example, when network traffic belongs to both the first guest room zone 318a and the remaining bandwidth zone 316, the zone enqueuing module 410 enqueues the network traffic on the first guest room queue 408a.

The zone enqueuing module 410 may determine the belonging zone by examining an IP or MAC address included in the network traffic and looking up in the user/zone database 419 to see to which zone that IP or MAC belongs. The mapping between IP or MAC address and the belonging zone may be stored in the user/zone database 419 by the authentication server 418 when the user logs in to the hotel's HSIA system. For example, when a guest staying in "Guest room A" successfully logs in using a laptop computer, the authentication server 418 may store the IP or MAC address utilized by the laptop computer as belonging to the first guest room zone 318a in user/zone database 419. Thereafter, the zone enqueuing module 410 enqueues received network traffic having the IP or MAC address of the laptop computer on the first guest room queue 408a.

Depending on the direction of the network traffic, e.g., upload or download, the IP or MAC address may be either the source or destination address. For example, if incoming network interface 404 is coupled to the hotel ISP pipe 302, the laptop's IP or MAC address may be the destination address of the network traffic. Alternatively, if the incoming network interface 404 is coupled to the hotel's LAN, the laptop's IP or MAC address may be the source address of the network traffic. A similar process may be used by the zone enqueuing module 410 to enqueue network traffic of other zones on the appropriate queue 408 corresponding to the zone that the network traffic belongs.

In another configuration, the zone enqueuing module 410 performs port detection by accessing various intermediate switches between the zone enqueuing module 410 and a user device in order to thereby track from which switch/port the network traffic originated. Each switch/port combination and belonging zone may be stored in the user/zone database 419. Other methods of correlating to which zone received network traffic belongs may also be used according to application specific designs.

Each queue 408 has a respective quantum 409 that determines how many bytes can be dequeued at a single time by the dequeuing module 412. For example, with a round robin dequeuing strategy and assuming all zones have data to send, all guaranteed rates have been met, and no zone has exceeded its designated cap, the dequeuing module 412 cycles one-by-one to each queue 408 at a particular tree-level and dequeues (i.e., removes) the queue's quantum number of bytes.

Using the exemplary quantum Q values illustrated in FIG. 3 as an example, for the first-level zones, the dequeuing module 412 dequeues 21,000 bytes of data from the first meeting room queue 408c, then dequeues 7500 bytes of data from the second meeting room queue 408d, then dequeues 60,000 bytes of data from the remaining bandwidth queue 408e, then dequeues 1500 bytes of data from the penthouse suite queue 408f, then dequeues 1500 bytes of data from the upgraded room queue 408g, and then returns to again dequeue 21,000 bytes of data from the first meeting room queue 308, and so on. If the bandwidth management system 400 is configured in the upload direction, the dequeued data is passed to the outgoing network interface 406 for transmission to various destinations on the Internet via the hotel ISP pipe 302. If the bandwidth management system 400 is configured in the download direction, the dequeued data is passed to the outgoing network interface 406 for transmission to various destinations on the hotel's LAN.

Although not illustrated in FIG. 4, the zone dequeuing module 412 may also extend between the second-level queues 408a, 408b and the first-level remaining bandwidth queue 408e. Again using the example quantum Q values illustrated in FIG. 3, a similar round robin dequeuing strategy may be employed by the dequeuing module 406 at the second-level to dequeue 1500 bytes of data from the first guest room queue 408a, then dequeue 1500 bytes of data from the second guest room queue 408b, and then return to again dequeue 1500 bytes of data from the first guest room queue 408a, and so on. Each set of dequeued data is thereafter enqueued on the remaining bandwidth queue 408e, i.e., the queue 408e corresponding to the next higher-level parent zone being the remaining bandwidth zone 316 in this example.

The quantum manager 420 dynamically adjusts the quantum values 409 of each queue 408 according to user load of the particular zone to which the queue 408 corresponds. In this example, the user load of each zone corresponds to a summation of how many current users are in the zone. The current users may be the active users that are competing for available bandwidth in the zone, which includes all child-zones under the zone.

To allow the quantum manager 420 to determine how many current users are in a particular zone, in a first example, the authentication server 418 manages logged in users of each zone and stores this information in the user/zone database 419. The quantum manager 420 queries the database 419 to sum how many users are logged in to the particular zone. For example, when a guest connects a laptop computer to the hotel network and logs in to the HSIA system from "Guest room B", the summation of how many users are logged into the second guest room zone 318b will be incremented by one. Additionally, because the remaining bandwidth zone 316 includes the second guest room zone 318b, the summation of how many users are logged into the remaining bandwidth zone 316 will also be incremented by one.

In another example, the zone enqueuing module 410 logs data transmission activity by users in the activity log 416. To determine the number of current users in a particular zone, the quantum manager 420 queries the activity log 416 to sum how many users have received or sent network traffic within the particular zone during a last predetermined time period. For example, the current users may be defined as the number of different users who have sent or received at least one Ethernet frame (or IP packet, etc) in the past ten minutes. Ten minutes after a guest in Guest room B stops browsing the Internet from their laptop, the summation of how many users have sent/received network traffic within the second guest room zone 318b will be decremented by one. Additionally, because the remaining bandwidth zone 316 includes the second guest room zone 318b, the summation of how many users have sent/received network traffic within the remaining bandwidth zone 316 will also be decremented by one.

In another example, the user monitor 414 periodically sends a ping to the IP address of network devices for each user. The user devices that have replied to the most recent ping are stored in the user/zone database 419. To determine the number of current users in a particular zone, the quantum manager 420 queries the user/zone database 419 to sum how many user devices in the particular zone have replied to the most recent ping. For example, after a guest in Guest room B shuts off their laptop, the summation of how many user devices have replied to the most recent ping from the second guest room zone 318b will be decremented by one. Additionally, because the remaining bandwidth zone 316 includes the second guest room zone 318b, the summation of how many user devices have replied to the most recent ping from the remaining bandwidth zone 316 will also be decremented by one.

Combinations of the above methods of determining the number of current users in each zone may also be employed. Additionally, as previously mentioned, in other configurations current users may refer to current human users rather than current user devices. As each human user may be associated in a database with one or more user devices (e.g., a single hotel guest may be utilizing both a mobile phone and a tablet computer to access the Internet), the summation indicating how many current users are in a particular zone in these configurations may be less than the above-described examples based on the number of user devices in the particular zone.

The plurality of zone queues 402 shown in the example block diagram of FIG. 4 may be implemented using a hierarchical token bucket (HTB) queuing discipline (qdisc) including an HTB for each queue 408. Using an HTB to implement each queue 408 allows for easy configuration of a rate, ceiling (cap), and quantum for each queue 408 as these parameters are already supported by HTB based queues. Although not illustrated, a stochastic fairness queuing (SFQ) qdisc may also be included for each user at the leaf zones 408a,b,c,d,f,g to ensure fairness between the different connections for the user. Linux based HTB and SFQ qdiscs are well-known in the art and further description of their operation and configuration is omitted herein for brevity.

FIG. 5 illustrates a quantum calculation table describing a calculation process that the quantum manager 420 utilizes in an exemplary configuration to calculate the quantums 409 for each queue 408 according to the number of current users per zone as shown in FIG. 3.

In this configuration, the quantums 409 are dynamically adjusted in proportion to the total number of current users (i.e., user load) under each zone. To beneficially increase efficiency, a minimum possible quantum is the MTU 426 and all quantums 409 are rounded up to their nearest positive integer multiple of the MTU 426. This allows dequeued data to be transmitted by the outgoing network interface 406 using one or more full capacity transport units (e.g., frames, packets, messages, etc). To prevent excessive monopolization of the shared ISP pipe 302, a maximum possible quantum is limited according to the maximum quantum ratio 422 multiplied by the MTU 426. This limits the number of concurrent MTU sized transport units that will be sent in a row from a single queue 408. Additionally, to increase responsiveness, when possible the quantums 409 are minimized while maintaining their relative ratios. This increases the frequency with which the zone dequeuing module 412 cycles through the queues 408 such as in a round robin order. In other implementations, different quantum optimization rules may be used.

In this example, the maximum quantum ratio 422 is predetermined at 1:40. Taking the above advantageous quantum optimization rules into consideration, the maximum value quantum is therefore forty times the MTU 426, which corresponds to forty full sized Ethernet frames of data (maximum of 60,000 bytes of data) being sent in a row from the outgoing network interface 406. The MTU of Ethernet is 1500 bytes and therefore a minimum possible quantum is 1500 bytes and all quantums are rounded to multiples of 1500 bytes.

With reference to FIG. 5, column 500 indicates the zone/queue name and column 502 indicates the user load of the zone being the number of current users in this example. Column 504 indicates a scale factor that the user load of each zone is multiplied with such that the maximum user load ("192" current users in this example) is scaled to the maximum possible quantum ("60,000" bytes in this example). Column 506 indicates a calculated scaled quantum for each zone being the scale factor of column 504 multiplied by the user load of column 502. Because the calculated scaled quantums of column 506 are not multiples of the MTU 426, column 508 indicates how many full MTU 426 sized frames would be required to transmit the calculated scaled quantum of data in column 506. Column 510 indicates a final rounded quantum value being the value of column 508 multiplied by the MTU 426. As the number of current users in each zone of FIG. 3 changes over time, the quantum manager 420 correspondingly recalculates the quantums of column 510 according to the above-described process.

Taking the penthouse suite zone 312 as an example, because the penthouse suite zone 312 has a guaranteed rate of 1 Mbit/sec, the zone dequeuing module 412 may more frequently dequeue 1500 bytes from the penthouse suite queue 408$f$ when the users in the penthouse suite zone 312 have traffic to send (and/or receive depending on the applicable direction of the guaranteed rate) and the guaranteed rate has not yet been met. However, when either the penthouse suite zone 312 does not need to utilize its guaranteed rate or has already exceeded its full guaranteed rate, the zone dequeuing module 406 may place both the remaining bandwidth queue 408$e$ and penthouse suite queue 408$f$ at a same priority in a round robin dequeuing order. In this situation, the remaining bandwidth zone 316 benefits by having up to 60,000 bytes dequeued and passed to the outgoing interface 406 each time around whereas the penthouse suite zone 314 will only have up to 1500 bytes dequeued and passed to the outgoing interface 406 each time around.

Assuming all guaranteed bandwidth rates have been met, the more current users in a zone, the more bytes that are dequeued each time from that zone's queue 408 by the zone dequeuing module 412. This is beneficial to prevent starvation of users who are in zones with a large number of other active users such as the remaining bandwidth zone 316 of FIG. 3. Zones having a very low number of active users such as the penthouse suite zone 312 and the upgraded room zone 314 receive much lower quantum values. In this way, the quantum 409$e$ for the remaining bandwidth queue 408$e$ is forty times the quantum 409$f$ of the penthouse suite queue 408$f$. When the penthouse suite zone 312 is borrowing available bandwidth over and above its guaranteed rate of 1 Mbit/sec, due to the large number of current users under the remaining bandwidth zone 316, the zone dequeuing module 412 will dequeue and pass to the outgoing network interface 406 forty times more data from the remaining bandwidth queue 408$e$ than from the penthouse suite queue 408$f$.

Even though the penthouse suite zone 312 has a guaranteed bandwidth rate and a higher bandwidth cap than the remaining bandwidth zone 316, the remaining bandwidth zone 316 receives preferential treatment when sharing available bandwidth due to having a larger user load than the penthouse suite zone 312. As the guest room zones 318 are under the remaining bandwidth zone 316 in the tree-structure of FIG. 3, the individual users in the various guest room zones 318 benefit because all their network traffic is subsequently enqueued on the remaining bandwidth queue 408$e$ before being dequeued and passed to the outgoing network interface 406 by the zone dequeuing module 412. Network traffic to/from these users depending on the configured direction(s) therefore spends less time waiting on the queues 408$a$, 408$b$, 408$e$ of the unreserved bandwidth zones 306 because of the higher quantum 409$e$ allocated to remaining bandwidth queue 408$e$.

Available bandwidth shared between the zones may be the leftover ISP pipe 302 bandwidth after all zones utilize up to their reserved rates. The zone dequeuing module 412 first ensures that all the zones having reserved rates get the amount of bandwidth they need up to their reserved rates, then all zones share the remaining available bandwidth up to their caps (i.e., ceilings). The dynamic quantums 409 adjusted according to the user load of zone are particularly useful when sharing bandwidth that exceeds guaranteed rates because zones having higher numbers of current users receive more of the available bandwidth than zones with lower numbers of current users. As previously explained, the current users of each zone may be the active users that have recently sent or received network traffic and are therefore currently competing for bandwidth.

FIG. 6 illustrates a quantum calculation table describing a calculation process that the quantum manager of FIG. 4 utilizes to calculate the quantums 409 for each queue 408 according to another example of numbers of current users of the zones shown in FIG. 3. Column 600 indicates the zone/queue name and column 602 indicates the number of current users per zone. As shown in this example, the hotel 300 is almost vacant and there are only a few users in each zone. In this configuration, for any zones having "0" users in column 602, the quantum manager 420 assumes that at least "1" user is present. Although there may initially be no users in the zone, if the quantum is set to 0 bytes, should the zone gain a user before the quantums 409 are next adjusted, the queue 408 corresponding to the zone will not have any data dequeued by the zone dequeue module 412. Additionally, when there are zero users in the zone, the queue 408 corresponding to the zone will not have network traffic to dequeue in the first place, so it is not necessary to set the quantum to 0 bytes.

Column 604 indicates a scale factor that the user load of each zone is multiplied with such that the minimum user load ("1" current users in this example) is scaled to the minimum possible quantum, which is 1500 bytes in this example (i.e., the MTU 426 of Ethernet). Column 606 indicates a calculated scaled quantum for each zone being the scale factor of column 604 multiplied by the user load of column 702. Because the calculated scaled quantums of column 606 are already multiples of the MTU 426, no further calculations are required and column 606 represents the final quantums 409. Again, in this example the remaining bandwidth zone 316 receives a higher quantum but now it is only 3.5 times that of the penthouse suite zone 312. The reason is the two zones 316, 312 now only have a 3.5 times differential in their respective users loads and therefore the remaining bandwidth zone 316 receives a corresponding ratio of preferential treatment by the zone dequeuing module 412.

Concerning the different types of scale factors in columns 504, 604, the scale factor illustrated in column 504 of FIG. 5 causes the quantum 409 of the queue 408 corresponding to the zone with the maximum user load to be set at the maximum quantum value (60,000 bytes in this example). This type of scale factor is particularly useful when the ratio between the minimum user load (rounded up to "1" if "0") to the maximum user load is greater than the maximum quantum ratio 422. For example, in the above examples, the maximum quantum ratio 422 is 1:40. Therefore, because the ratio of the minimum user load of "1" in column 502 of FIG. 5 to the maximum user load of "192" in column 502 of FIG. 5 is greater than 1:40, the scale factor 504 scales the quantums to the maximum range so that the ratio between the minimum quantum and the largest quantum meets the maximum quantum ratio 422 ("1:40" in this example). This gives the greatest amount of preferential treatment to the zone having the greatest user load without allowing that zone to monopolize the hotel's ISP connection by sending more than forty full MTU sized Ethernet packets in a row.

In contrast, the scale factor illustrated in column 604 of FIG. 6 causes the quantum 409 of the queue 408 corresponding to the zone with the minimum user load (rounded up to "1" if "0") to be set at the MTU 422 of the outgoing network interface (e.g., 1500 bytes in this example). This type of scale factor is particularly useful when the ratio between the minimum user load (rounded up to "1" if "0") to the maximum user load is not greater than the maximum quantum ratio 422. For example, assuming again that the maximum quantum ratio 422 is 1:40, because the ratio of the minimum user load of "1" in column 602 of FIG. 6 to the maximum user load of "7" in column 602 of FIG. 6 is not greater than 1:40, the scale factor 604 scales the quantums to multiples of the MTU 422 while ensuring that the ratio between the minimum quantum and the largest quantum is the same as the ratio between the minimum user load (rounded up to "1" if 0) to the maximum user load. This give the exact ratio of preferential treatment to the zone having the greatest user load while also maximizing the interactivity of all zones by minimizing the quantums 409.

In an advantageous configuration, the quantum manager 420 automatically checks the ratio between the minimum user load and the maximum user load and utilizes the best type of scaling factor. For example, the quantum manager 420 may be configured to scale the quantums 409 such that a smallest quantum is the MTU 426 of the outgoing network interface 406 when a ratio of the minimum user load to the maximum user load is less than a predetermined threshold ratio 422, and to scale the quantums 409 such that the largest quantum is a predetermined maximum amount when the ratio of the minimum user load to the maximum user load is greater than the predetermined threshold ratio 422.

Figure 7:
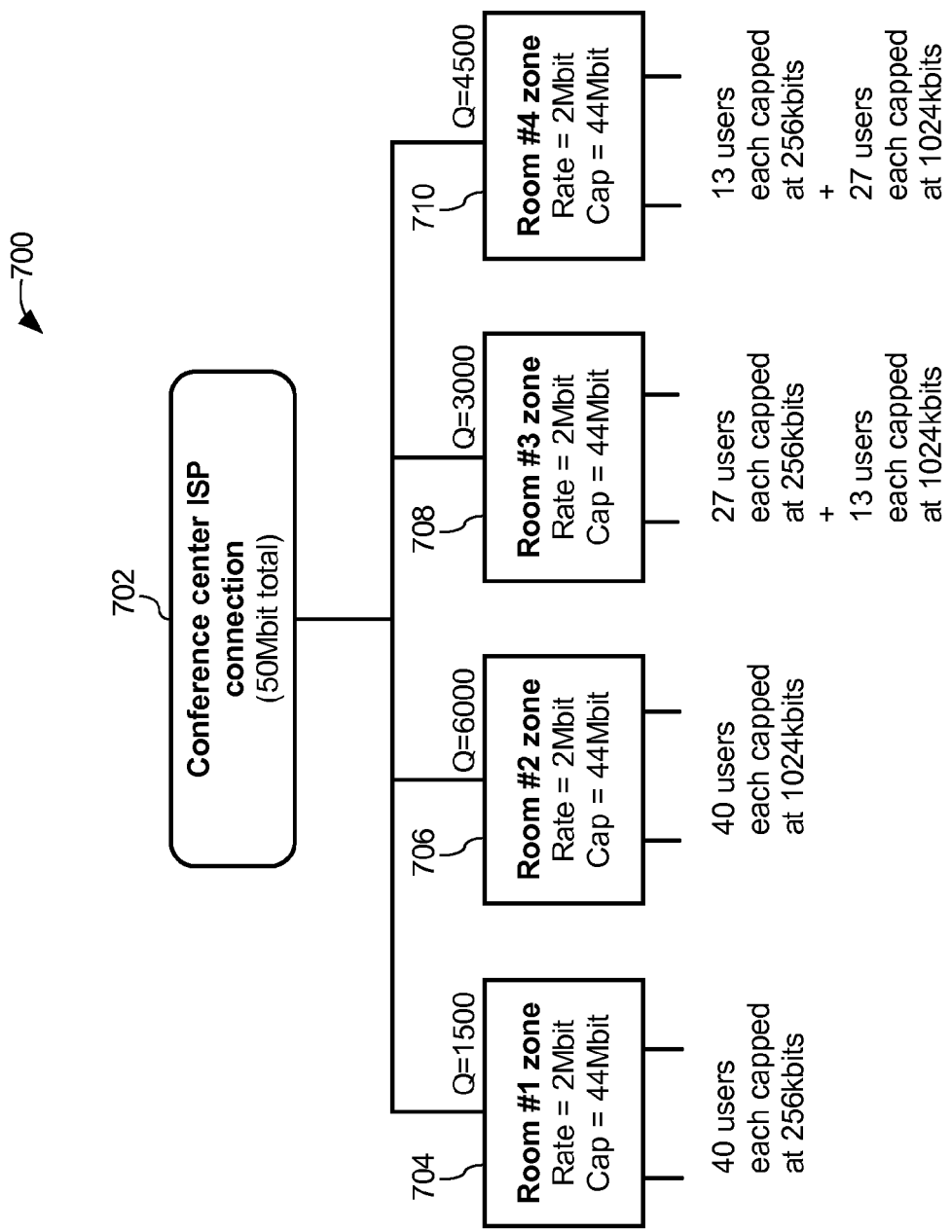
FIG. 7 illustrates a beneficial organization of meeting room bandwidth zones in a conference center according to an exemplary configuration of the invention.

FIG. 7 illustrates a beneficial organization of bandwidth zones in a conference center 700 according to another exemplary configuration of the invention. In this example, the conference center's ISP connection 702 provides a total bandwidth of 50 Mbit/sec shared between a number of room zones 704, 706, 708, 710 such as different meeting rooms or conference rooms. All the zones 704, 706, 708, 710 are at the first-level of the tree-structure and have equal guaranteed bandwidth rates of 2 Mbit/sec and equal bandwidth caps of 44 Mbit/sec. Although not illustrated, a bandwidth management system similar to that illustrated in FIG. 4 may be employed at the conference center 700 in order to allocate available bandwidth between the zones 704, 706, 708, 710 according to the quantum of each zone.

The reason equal rates and caps are used in this example is to illustrate how the quantums Q may be adjusted for each zone 704, 706, 708, 710 according to user load even when all zones are entitled to the same share of the overall conference center bandwidth 702. However, similar to the previous example, the below-described techniques may also be employed when the rates and caps of the zones 704, 706, 708, 710 are different and dynamically changing as different meetings begin and end, for example.

In the conference center 700, users are given a basic individual bandwidth cap of 256 kbit/sec and have the option to upgrade to a higher individual bandwidth cap of 1024 kbit/sec. FIG. 7 indicates an example situation where the first room zone 704 has forty users at the basic bandwidth cap of 256 kbit/sec, the second room zone 706 has forty users at the upgraded bandwidth cap of 1024 kbit/sec, the third room zone 708 has twenty-seven users at the basic bandwidth cap of 256 kbit/sec and thirteen users at the upgraded bandwidth cap of 1024 kbit/sec, and the fourth room zone 710 has thirteen users at the basic bandwidth cap of 256 kbit/sec and twenty-seven users at the upgraded bandwidth cap of 1024 kbit/sec.

FIG. 8 illustrates a quantum calculation table describing a calculation process that a quantum manager may utilize to calculate the quantums for each zone shown in FIG. 8 when user load corresponds to a summation of user caps of the current users in each zone.

Column 800 indicates the zone/queue name, column 802 indicates the number of current users capped at 256 kbit/sec, and column 804 indicates the number of current users capped at 1024 kbit/sec. Column 806 indicates the user load of each zone being the summation of individual user caps (i.e., the number of users in column 802 multiplied by 256 kbit/sec plus the number of users in column 804 multiplied by 1024 kbit/sec).

Because the ratio of the minimum user load ("10240" in this example) to maximum user load ("40960" in this example) is less than the maximum quantum ratio 422 ("1: 40" in this example), column 808 indicates a scale factor that the user load of each zone is multiplied with such that the minimum user load ("10240" in this example) is scaled to the MTU of an outgoing network interface (1500 bytes in this example).

Column 810 indicates a calculated scaled quantum for each zone being the scale factor of column 808 multiplied by the user load of column 806. Because the calculated scaled quantums of column 810 are not multiples of the MTU, column 812 indicates a final rounded quantum value being the value of column 810 rounded to the nearest multiple of the MTU.

The higher the summation of individual user caps in a zone, the more bytes that are dequeued each time from that zone's queue. This is beneficial to prevent starvation of users who are sharing zones with a large number of other active users. Additionally, rather than only judging user load according to number of users, this configuration also takes into account individual user caps. This helps increase user satisfaction because as users in a zone upgrade to higher individual bandwidth caps, the zone to which they belong has higher user load and may therefore receive a larger quantum value. The higher the total user caps in a zone, the higher each individual user's effective bandwidth will be when the zone shares available bandwidth with other zones.

Figure 9:
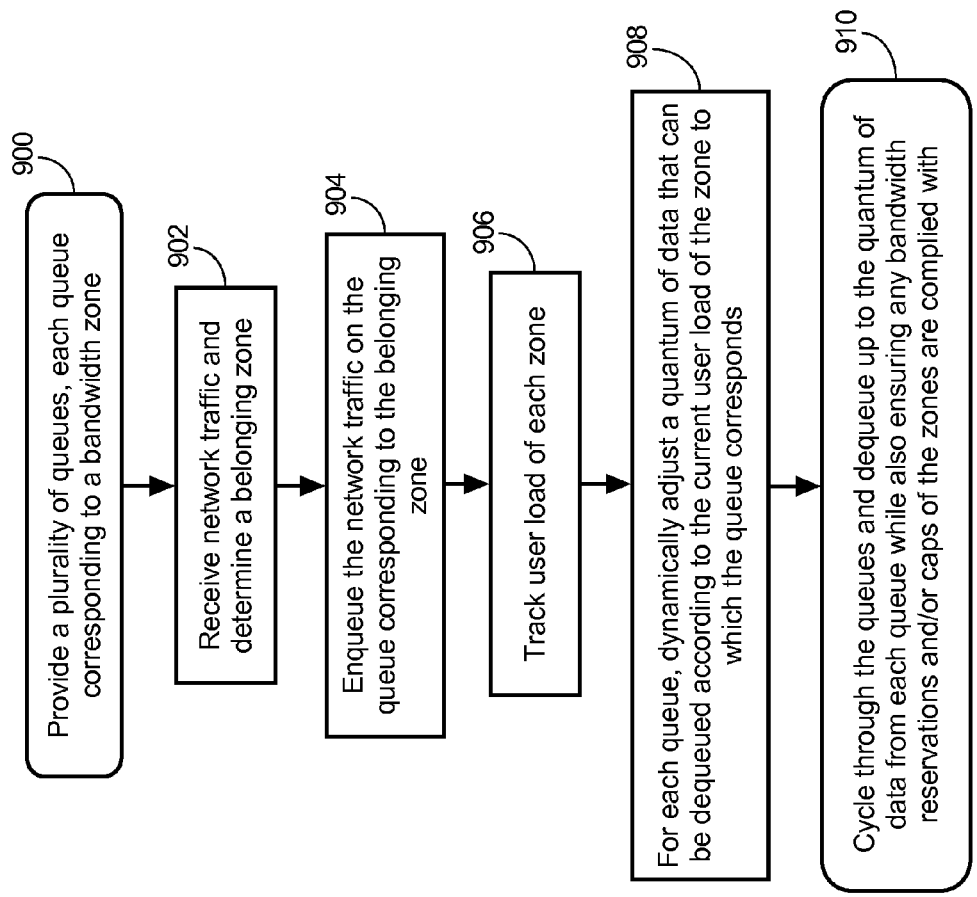
FIG. 9 illustrates a flowchart describing a method of allocating bandwidth between zones according to user load in an exemplary configuration of the invention.

FIG. 9 illustrates a flowchart describing a method of allocating bandwidth in a system having a plurality of queues respectively corresponding to a plurality of zones according to an exemplary configuration of the invention. The steps of the flowchart are not restricted to the exact order shown, and, in other configurations, shown steps may be omitted or other intermediate steps added. In this configuration, a bandwidth management system performs the following operations:

Step 900: A plurality of queues are provided, where each queue corresponding to a bandwidth zone. The zones may be allocated once upon initial configuration, or may be changed dynamically throughout operation according to different requirements. For example, a meeting room rate/cap may be changed as different meetings begin and end. The zones may be defined and/or identified using different LANs, VLANs, switch port numbers, pass codes, zone codes, usernames, service set identifiers (SSIDs), room numbers, names of physical areas, IP and other addresses, etc.

Step 902: Network traffic is received, and a belonging zone to which the network traffic belongs is determined. For example, the belonging zone may be the source zone from which the network traffic originated or the destination zone for which the network traffic is destined. The belonging zone may be determined by examining zone identification information included in each received packet/frame such as IP addresses, MAC addresses, cookie information, VLAN tag, or other information. This zone identification information may be correlated to the correct belonging zone in a database. Due to a zone tree-structure, network traffic may in fact belong to several zones at different levels of the tree-structure, for example, to both remaining bandwidth zone 316 and one of guest room zones 318 illustrated in FIG. 3. In this example, the database associates zone identification information with a single belonging zone being the lowest belonging zone according to the tree-structure. For instance, depending on the configured direction, network traffic to/from guest room A is determined by the zone enqueuing module 410 to belong to the guest room A zone 318a (i.e., the lowest-level belonging zone).

In another configuration, the belonging zone may be determined by querying intermediate devices such as intermediate switches, routers, gateways, etc for zone identification information such as source/destination port numbers or interface identifiers in order to determine the belonging zone. For example, an intermediate switch may be queried using simple network management protocol (SNMP) to determine to which port a device having an IP address included in the network traffic is associated. The belonging zone is then determined according to the associated switch port (i.e., each switch port may correspond to a particular zone).

Step 904: The network traffic is enqueued on the queue corresponding to the belonging zone. For example, a zone enqueuing module 410 such as that illustrated in FIG. 4 may enqueue network traffic received at step 902 on the queue 408 corresponding to the belonging zone determined at that step.

Step 906: A user load of each zone is tracked. In one example, the user load of a zone corresponds to a summation indicating how many current users are in the zone. Current users per zone may defined and tracked in a number of ways including active ports per zone, number of logged in users per zone, number of outgoing or incoming connections per zone, number of traffic packets/frames per zone, active users who have sent/received network traffic, users who have replied to a recent ping request, or any combination of any of the above. Additionally, a time window may be utilized such as the past 10 minutes and/or the number of current users may be periodically determined once per time window. In another example, the user load of a zone may further take into account individual attributes of users in the zone. For example, user load of a zone may correspond to a summation of individual user caps of the current users in the zone. In another example, user load of a zone may correspond to a summation of how much data current users in the zone have recently sent or received (e.g., in the past 10 minutes). In another example, user load of a zone may correspond to the amount of user network traffic currently enqueued on one or more queues corresponding to the zone. When the zones are organized in a multi-level zone tree-structure, the user load of a particular zone may include the user load of all lower-level zones under the particular zone.

Step 908: For each queue, a quantum of data that can be dequeued together is dynamically adjusted according to the user load of the zone to which the queue corresponds. For example, a quantum manager may dynamically adjust how many bytes will be dequeued from each zone according to the user load per zone as tracked at step 906. In general, zones having higher user loads will have the capability to transfer larger numbers of bytes when dequeuing traffic. This is beneficial to prevent zones having low user loads but high guaranteed rates and/or bandwidth caps from getting a disproportionate amount of available bandwidth that is being shared with other zones having high current user loads. As the user loads of the zones change over time, the quantums may be automatically adjusted to give preferential treatment to the zones according to their new user loads.

Step 910: Data is selectively dequeued from the queues and passed to one or more outgoing network interfaces. When selectively dequeuing data from the queues, an amount of data is dequeued from a selected queue according to the quantum of the queue determined at step 908. As explained above, the quantum of the selected queue is determined according to user load of the zone to which the selected queue corresponds. In one usage example, the queues are selected one by one (e.g., in a round robin order), and up to the selected queue's quantum of data is dequeued from each queue while also ensuring any bandwidth reservations and/or caps of the zones are complied with. By still ensuring that bandwidth reservations and/or caps of the zones are complied with, the invention may be beneficially used in combination with and to enhance existing bandwidth management systems employing rates and caps.

An advantage of the invention is that it allows a hotel to limit bandwidth utilization on a zone-by-zone basis such as by defining each guest room to be a zone with its own reserved bandwidth rate/cap. The zone tree-structure also allows a first-level zone to include a number of second-level zones, which advantageously allows second-level zones that may individually have low user loads to accumulate their user loads together in a single first-level zone and gain preferential treatment. According to the zone tree-structure, zones dequeue an amount of data to pass to destinations being either a next higher-level zone or one or more destination network interface(s) in proportion to their user loads. By enqueuing network traffic from a plurality of second-level zones into a single queue of their corresponding first-level zone, users of the second-level zones receive increased bandwidth when data of the first-level queue is dequeued in larger amounts. Zones having higher user loads may advantageously receive more of the available bandwidth, which prevents individual users under these zones from being starved. Another advantage of the invention is that because rates and caps of zones and individual users continue to be enforced, the invention is compatible with many existing bandwidth management techniques. Yet another advantage is that when a zone having a reserved bandwidth rate and/or cap does not need to use up to its reserved bandwidth rate/cap (e.g., when the users in the zone are not using the Internet), the unneeded bandwidth may be shared among other zones according to the relative user loads of the other zones. More of the available bandwidth is thereby beneficially allocated to zones having higher current user loads. As user loads of the zones change over time, the amount of data to be dequeued from their respective queues is dynamically updated.

Adjusting the quantum 409 of each queue 408 in proportion to the user load of its corresponding zone helps prevent bandwidth starvation of users without guaranteed rates. For instance, users under a zone with a relatively lower user load have less competition for bandwidth allocated to that zone. In contrast, users under a zone having a relatively higher user load will have more competition for bandwidth allocated to that zone and the data in its queue 408 (and in any higher level parent queue(s) 408) will therefore tend to build up more quickly. To help prevent bandwidth starvation of these users and increase the fairness of bandwidth allocation between zones, the quantum manager 420 dynamically allocates quantums 409 to the queues 408 such that queues 408 corresponding to zones having lower user loads receive smaller quantums 409, and queues 408 corresponding to zones having higher user loads receive larger quantums 409. In this way, a single user who is trying to utilize large amounts of bandwidth over and above his guaranteed rate in a first zone (e.g., meeting room) will not negatively impact multiple users who don't have any reserved bandwidth under other zones (e.g., guest rooms zones).

In an exemplary configuration, a bandwidth management system includes a plurality of queues respectively corresponding to a plurality of zones. An enqueuing module receives network traffic from one or more incoming network interfaces, determines a belonging zone to which the network traffic belongs, and enqueues the network traffic on a queue corresponding to the belonging zone. A dequeuing module selectively dequeues data from the queues and passes the data to one or more outgoing network interfaces. When dequeuing data from the queues the dequeuing module dequeues an amount of data from a selected queue, and the amount of data dequeued from the selected queue is determined according to user load of a zone to which the selected queue corresponds.

Although the invention has been described in connection with a preferred embodiment, it should be understood that various modifications, additions and alterations may be made to the invention by one skilled in the art without departing from the spirit and scope of the invention as defined in the appended claims. For example, although the invention has been described as being utilized at a hotel, the invention is equally applicable to any hospitality related location or service wishing to allocate available bandwidth between multiple users including but not limited to hotels, motels, resorts, hospitals, apartment/townhouse complexes, restaurants, retirement centers, cruise ships, busses, airlines, shopping centers, passenger trains, etc. The exemplary user of "guest" is utilized in the above description because customers of hospitality establishments are generally referred to as guests; however, the exemplary user of "guest" in conjunction with the invention further includes all types of users whether or not they are customers. The invention may also be beneficially employed in other applications outside the hospitality industry such as by conference centers, corporations, or any other entity wishing to allocate available bandwidth shared between a plurality of users.

The various separate elements, features, and modules of the invention described above may be integrated or combined into single units. Similarly, functions of single modules may be separated into multiple units. The modules may be implemented as dedicated hardware modules, and the modules may also be implemented as one or more software programs executed by a general or specific purpose processor to cause the processor to operate pursuant to the software program to perform the above-described module functions. For example, the bandwidth management system 400 of FIG. 4 may be implemented by a computer server having one or more processors 430 executing a computer program loaded from a storage media (not shown) to perform the above-described functions of the zone enqueuing module 410, quantum manager 420, and zone dequeuing module 412. Likewise, the flowchart of FIG. 9 may be implemented as one or more processes executed by dedicated hardware, and may also be implemented as one or more software programs executed by a general or specific purpose processor to cause the processor to operate pursuant to the software program to perform the flowchart steps. A computer-readable medium may store computer executable instructions that when executed by a computer cause the computer to perform above-described method steps of FIG. 9. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. In one configuration, the computer is a computer server connected to a network such as the Internet and the computer program stored on a hard drive of the computer may be dynamically updated by a remote server via the Internet. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A bandwidth management system for allocating bandwidth between a plurality of bandwidth zones at an establishment serving a plurality of users, each zone having a number of users competing for bandwidth allocated to the zone, wherein each of the users has an individual bandwidth cap, and at least one of the individual bandwidth caps changes over time; the bandwidth management system comprising:
   a computer server providing a plurality of queues, wherein each of the zones has a corresponding queue; and
   a computer readable medium storing a plurality of software modules for execution by the computer server;
   wherein the software modules include an enqueuing module that when executed by the computer server causes the computer server to receive network traffic from one or more incoming network interfaces of the computer server, determine a belonging zone to which the network traffic belongs, and enqueue the network traffic on a queue corresponding to the belonging zone;
   the software modules further include a dequeuing module that when executed by the computer server causes the computer server to selectively dequeue data from the queues and pass the data to one or more outgoing network interfaces of the computer server;

the software modules further include a quantum manager that when executed by the computer server causes the computer server to dynamically adjust values of a plurality of quantums, each of the queues having a respective quantum associated therewith;

wherein, when a selected queue has no guaranteed bandwidth rate or has already reached its guaranteed bandwidth rate, the dequeuing module causes the computer server to dequeue at most an amount of data from the selected queue up to the quantum of the selected queue before dequeuing data from another of the queues;

the quantum manager causes the computer server to dynamically adjust the values of the quantums in proportion to a summation value of the individual bandwidth caps of the users in each zone as the individual bandwidth caps change over time; the values of the quantums being automatically adjusted such that the quantum of a first queue is a higher value than the quantum of a second queue while the zone to which the first queue corresponds has a higher summation value of the individual bandwidth caps of the users than the zone to which the second queue corresponds, and such that the quantum of the first queue is a lower value than the quantum of the second queue while the zone to which the first queue corresponds has a lower summation value of the individual bandwidth caps of the users than the zone to which the second queue corresponds;

at least one of the zones is a first-level zone that includes a plurality of second-level zones not entitled to any guaranteed bandwidth rate;

network traffic enqueued on one or more queues corresponding to the second-level zones is dequeued and then enqueued on the queue corresponding to the first-level zone; and the quantum manager causes the computer server to determine the summation value of the individual bandwidth caps of the users of the first-level zone by accumulating the individual bandwidth caps of the users under each of the second-level zones.

2. The bandwidth management system of claim 1, further comprising:
an authentication server for managing logged in users of each of the zones;
wherein the users in each zone at a particular time corresponds to the logged in users of each zone at the particular time.

3. The bandwidth management system of claim 1, further comprising:
a log for logging network traffic activity;
wherein the users in each zone at a particular time corresponds to users who have received or sent network traffic within each zone during a last predetermined time period according to the log.

4. The bandwidth management system of claim 1, further comprising:
a user monitor for periodically sending a ping to each user in each of the zones;
wherein the users in each zone at a particular time corresponds to users in each zone who replied to a most recent ping.

5. The bandwidth management system of claim 1, wherein, when all zones have data to send, all guaranteed bandwidth rates have been met, and no zone has exceeded its designated cap, the dequeuing module cycles through the queues in a round robin dequeuing strategy and dequeues the quantum of data associated with each queue.

6. The bandwidth management system of claim 1, wherein the quantum manager is configured to scale the values of the quantums such that a smallest quantum value represents a maximum transmission unit (MTU) of the one or more outgoing network interfaces.

7. The bandwidth management system of claim 1, wherein the quantum manager is configured to scale the values of the quantums such that a largest quantum value represents a predetermined maximum amount being a multiple of a maximum transmission unit (MTU) of the one or more outgoing network interfaces.

8. The bandwidth management system of claim 1, wherein the quantum manager is configured to round the values of each of the quantums to a multiple of a maximum transmission unit (MTU) of the one or more outgoing network interfaces.

9. The bandwidth management system of claim 1, wherein each zone corresponds to one or more rooms of a hotel.

10. The bandwidth management system of claim 1, wherein each user corresponds to a different user device.

11. The bandwidth management system of claim 1, wherein, besides the first-level zone and the second-level zones under the first-level zone, all the other zones are entitled to one or more guaranteed bandwidth rates.

12. A method of allocating bandwidth between a plurality of bandwidth zones at an establishment serving a plurality of users, each zone having a number of users competing for bandwidth allocated to the zone, wherein each of the users has an individual bandwidth cap, and at least one of the individual bandwidth caps changes over time, the method comprising:
providing a plurality of queues, wherein each of the zones has a corresponding queue;
receiving network traffic from one or more incoming network interfaces;
determining a belonging zone to which the network traffic belongs;
enqueuing the network traffic on a queue corresponding to the belonging zone;
selectively dequeuing data from the queues and passing the data to one or more outgoing network interfaces; and
dynamically adjusting values of a plurality of quantums, each of the queues having a respective quantum associated therewith;
wherein, when a selected queue has no guaranteed bandwidth rate or has already reached its guaranteed bandwidth rate, selectively dequeuing data from the queues comprises dequeuing at most an amount of data from the selected queue up to the quantum of the selected queue before dequeuing data from another of the queues;
dynamically adjusting values of the quantums comprises dynamically adjusting the values of the quantums in proportion to a summation value of the individual bandwidth caps of the users in each zone as the individual bandwidth caps change over time; the values of the quantums being automatically adjusted such that the quantum of a first queue is a higher value than the quantum of a second queue while the zone to which the first queue corresponds has a higher summation value of the individual bandwidth caps of the users than the zone to which the second queue corresponds, and such that the quantum of the first queue is a lower value than the quantum of the second queue while the zone to which the first queue corresponds has a lower summation value of the individual bandwidth caps of the users than the zone to which the second queue corresponds;

at least one of the zones is a first-level zone that includes a plurality of second-level zones not entitled to any guaranteed bandwidth rate, and the method further comprises:

dequeuing network traffic enqueued on one or more queues corresponding to the second-level zones and then enqueuing it on the queue corresponding to the first-level zone; and determining the summation value of the individual bandwidth caps of the users of the first-level zone by accumulating the individual bandwidth caps of the users under each of the second-level zones.

13. The method of claim 12, further comprising:
managing logged in users of each of the zones;
wherein the users in each zone at a particular time corresponds to the logged in users of each zone at the particular time.

14. The method of claim 12, further comprising:
scaling the values of the quantums such that a smallest quantum value is a maximum transmission unit (MTU) of the one or more outgoing network interfaces when a ratio of a minimum number of users to a maximum number of users is less than a predetermined threshold ratio; and
scaling the values of the quantums such that a largest quantum value is a predetermined maximum amount when the ratio of the minimum number of users to the maximum number of users is greater than the predetermined threshold ratio.

15. The method of claim 12, further comprising:
ensuring a maximum bandwidth cap of the selected zone is not exceeded; and
ensuring the selected zone receives at least a guaranteed bandwidth allotment.

16. A non-transitory computer-readable medium comprising computer executable instructions that when executed by a computer cause the computer to perform the method of claim 12.

17. The method of claim 12, wherein each zone corresponds to one or more physically separate areas at the establishment.

18. The method of claim 12, wherein, wherein, besides the first-level zone and the second-level zones under the first-level zone, all the other zones are entitled to one or more guaranteed bandwidth rates.

19. A bandwidth management system for allocating bandwidth between a plurality of bandwidth zones at an establishment serving a plurality of users, each zone having a number of users competing for bandwidth allocated to the zone, wherein each of the users has an individual bandwidth cap, and at least one of the individual bandwidth caps changes over time, the system comprising:
a plurality of queues, wherein each of the zones has a corresponding queue; and
one or more processors configured to:
receive network traffic from one or more incoming network interfaces;
determine a belonging zone to which the network traffic belongs;
enqueue the network traffic on a queue corresponding to the belonging zone;
selectively dequeue data from the queues;
pass the data to one or more outgoing network interfaces; and
dynamically adjust values of a plurality of quantums, each of the queues having a respective quantum associated therewith;
wherein, when a selected queue has no guaranteed bandwidth rate or has already reached its guaranteed bandwidth rate, the one or more processors are configured to dequeue at most an amount of data from the selected queue up to the quantum of the selected queue before dequeuing data from another of the queues;
the one or more processors are configured to dynamically adjust the values of the quantums in proportion to a summation value of the individual bandwidth caps of the users in each zone as the individual bandwidth caps change over time; the values of the quantums being automatically adjusted such that the quantum of a first queue is a higher value than the quantum of a second queue while the zone to which the first queue corresponds has a higher summation value of the individual bandwidth caps of the users than the zone to which the second queue corresponds, and such that the quantum of the first queue is a lower value than the quantum of the second queue while the zone to which the first queue corresponds has a lower summation value of the individual bandwidth caps of the users than the zone to which the second queue corresponds;
at least one of the zones is a first-level zone that includes a plurality of second-level zones not entitled to any guaranteed bandwidth rate, and the one or more processors are further configured to:
dequeue network traffic enqueued on one or more queues corresponding to the second-level zones and then enqueue it on the queue corresponding to the first-level zone; and
determine the summation value of the individual bandwidth caps of the users of the first-level zone by accumulating the individual bandwidth caps of the users under each of the second-level zones.

20. The bandwidth management system of claim 19, wherein, besides the first-level zone and the second-level zones under the first-level zone, all the other zones are entitled to one or more guaranteed bandwidth rates.

* * * * *